(12) United States Patent
Kim

(10) Patent No.: US 10,889,315 B2
(45) Date of Patent: Jan. 12, 2021

(54) SUPPORTING APPARATUS FOR STEERING GEAR BOX

(71) Applicant: HYUNDAI MOBIS CO., LTD., Seoul (KR)

(72) Inventor: Tae Yoon Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 133 days.

(21) Appl. No.: 16/206,078

(22) Filed: Nov. 30, 2018

(65) Prior Publication Data

US 2019/0193773 A1 Jun. 27, 2019

(30) Foreign Application Priority Data

Dec. 26, 2017 (KR) .................. 10-2017-0178996

(51) Int. Cl.
| | | |
|---|---|---|
| *B62D 3/12* | (2006.01) | |
| *F16H 55/22* | (2006.01) | |
| *F16H 55/24* | (2006.01) | |
| *F16H 19/04* | (2006.01) | |
| *F16H 55/28* | (2006.01) | |

(52) U.S. Cl.
CPC ............ *B62D 3/123* (2013.01); *F16H 19/04* (2013.01); *F16H 55/22* (2013.01); *F16H 55/24* (2013.01); *F16H 55/283* (2013.01)

(58) Field of Classification Search
CPC ... B62D 3/123; F16H 55/22; F16H 2019/046; F16H 55/00; F16H 55/24; F16H 55/283
See application file for complete search history.

(56) References Cited

U.S. PATENT DOCUMENTS

| | | | |
|---|---|---|---|
| 5,718,149 A | 2/1998 | Phillips | |
| 5,802,919 A * | 9/1998 | Phillips | F16H 55/283 384/37 |
| 2013/0091979 A1 * | 4/2013 | Bareis | F16H 55/283 74/568 R |
| 2016/0223066 A1 * | 8/2016 | Imamura | B62D 3/123 |
| 2019/0193773 A1 * | 6/2019 | Kim | B62D 3/123 |

FOREIGN PATENT DOCUMENTS

| | | | |
|---|---|---|---|
| JP | 2006-282110 A | | 10/2006 |
| JP | 2008-080983 A | | 4/2008 |
| JP | 2008080983 A | * | 4/2008 |
| KR | 10-2004-0058617 A | | 7/2004 |

* cited by examiner

*Primary Examiner* — Vicky A Johnson
(74) *Attorney, Agent, or Firm* — Knobbe Martens Olson & Bear LLP

(57) ABSTRACT

A supporting apparatus for a steering gear box includes a pressing yoke part for supporting a side surface of a rack bar to be engaged with a steering input gear in a shape to wrap the side surface of the rack bar, a supporting yoke part provided in a mounting groove together with the pressing yoke part, an elastic link part formed of an elastic material and extending from the pressing yoke part to be inserted into the supporting yoke part, a cover part provided at a position opposite to the supporting yoke part and shielding an inlet of the mounting groove, and a pressing part located between the supporting yoke part and the cover part and pressing the supporting yoke part by a predetermined elastic force.

6 Claims, 7 Drawing Sheets

SUPPORTING APPARATUS FOR STEERING GEAR BOX

CROSS-REFERENCES TO RELATED APPLICATIONS

The present application claims priority to Korean application number 10-2017-0178996, filed on Dec. 26, 2017, which is incorporated by reference in its entirety.

BACKGROUND OF THE INVENTION

The present invention relates to a supporting apparatus for a steering gear box, and more particularly, to a supporting apparatus for a steering gear box, which moves along the movement of a rack bar and presses the rack bar in a steering input gear direction.

Generally, a vehicle is provided with a motor driven power steering (MDPS) system for changing a steering force according to a driving speed.

The MDPS system is a vehicle speed sensitive power steering apparatus, and the control part of the MDPS module controls steering angle and motor movement according to the vehicle speed to provide the driver with optimum steering feeling.

The MDPS system for assisting a steering power by a rotation force of a motor includes an MDPS column part in which a driver inputs steering power, a motor for generating power for steering, a control part for receiving a vehicle speed to control the drive of the motor, a worm wheel part mounted on an output shaft of the motor and transmitting a steering force to a steering gear box, and a steering input gear connected to an output shaft of the worm wheel part and the steering gear box.

The steering input gear for receiving a steering torque from the worm wheel and rotating is provided inside the steering gear box, and a rack bar engaged with the steering input gear and capable of being moved left and right extends in the left and right directions through the steering gear box.

The rack br can be kept engaged with the steering input gear by a yoke part supporting the rear side of the rack bar.

Conventionally, the yoke part was moved only in the left-right direction perpendicular to the steering input gear. However, when the rack bar is moved in a direction other than the left-right direction, the yoke part cannot support the rack bar, so that vibration and noise are generated, which may cause uneven wear on the yoke part. Therefore, there is a need for improvement.

The related art of the present invention is disclosed in Korean Patent Publication No. 2004-0058617 published on Jul. 5, 2004.

SUMMARY OF THE INVENTION

Embodiments of the present invention are directed to a supporting apparatus for a steering gear box, which moves along the movement of a rack bar and presses the rack bar in a steering input gear direction.

The supporting apparatus for a steering gear box according to an aspect of the present invention may include: a pressing yoke part for supporting a rack bar to be engaged with a steering input gear in a shape to wrap the side surface of the rack bar, a supporting yoke part provided in a mounting groove part together with the pressing yoke part, an elastic link part formed of an elastic material and extending from the pressing yoke part to be inserted into the supporting yoke part, a cover part provided at a position facing the supporting yoke part and shielding an inlet of the mounting groove part, and a pressing part located between the supporting yoke part and the cover part and pressing the supporting yoke part by a predetermined elastic force.

The pressing yoke part may include: a curved liner portion contacting a side surface of the rack bar; and a head portion connected to the liner portion at one side and connected to the elastic link part at the other side.

The head portion may have a convex curved side surface facing the supporting yoke part.

The supporting yoke part may include: a cylindrical tubular supporting body inserted into the mounting groove part; an inner supporting portion for shielding one side of the supporting body facing the head portion and rotatably supporting the head portion; and a mounting hole portion for forming a hole penetrating the inner supporting portion and mounting the elastic link part.

The inner supporting portion may have a concave curved surface on a side facing the head portion.

The elastic link part may include: a link body of an elastic material, which extends from the head portion and passes through the mounting hole portion; and a latching protrusion protruding from the link body and caught by the inside of the inner supporting portion.

The pressing part may use a coil spring, one side of the pressing part may be in contact with the inner supporting portion, and the other side of the pressing part may be in contact with the cover part.

A screw thread may be formed on an outer side of the cover part so as to engage with a screw thread formed in the mounting groove part.

DESCRIPTION OF SPECIFIC EMBODIMENTS

Hereafter, a supporting apparatus for a steering gear box in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
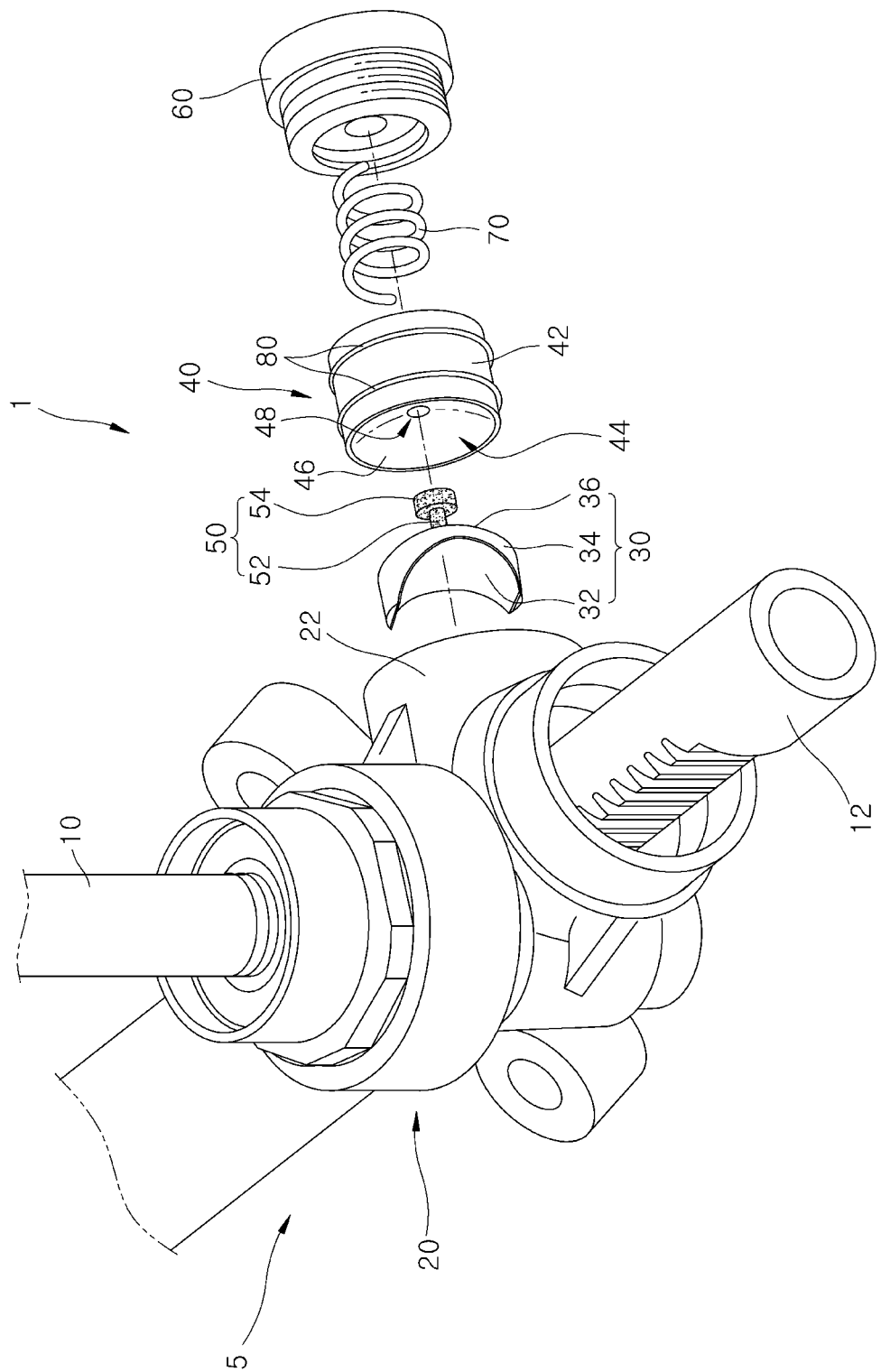
FIG. 1 is an exploded perspective view schematically illustrating a structure of a supporting apparatus for a steering gear box in accordance with an embodiment of the present invention.
Figure 2:
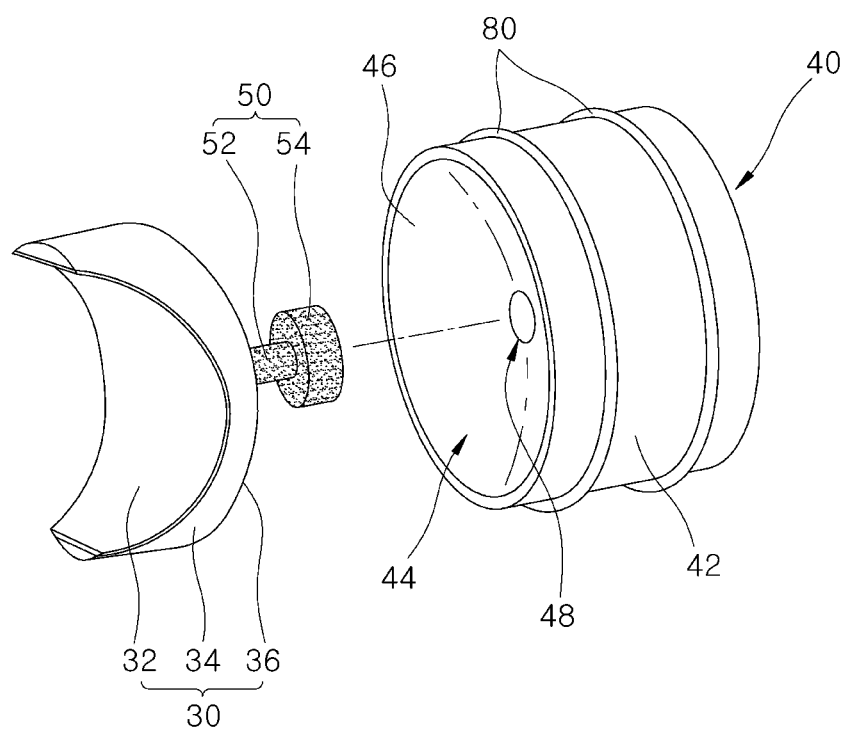
FIG. 2 is an exploded perspective view illustrating a pressing yoke part and a supporting yoke part in accordance with an embodiment of the present invention.
Figure 3:
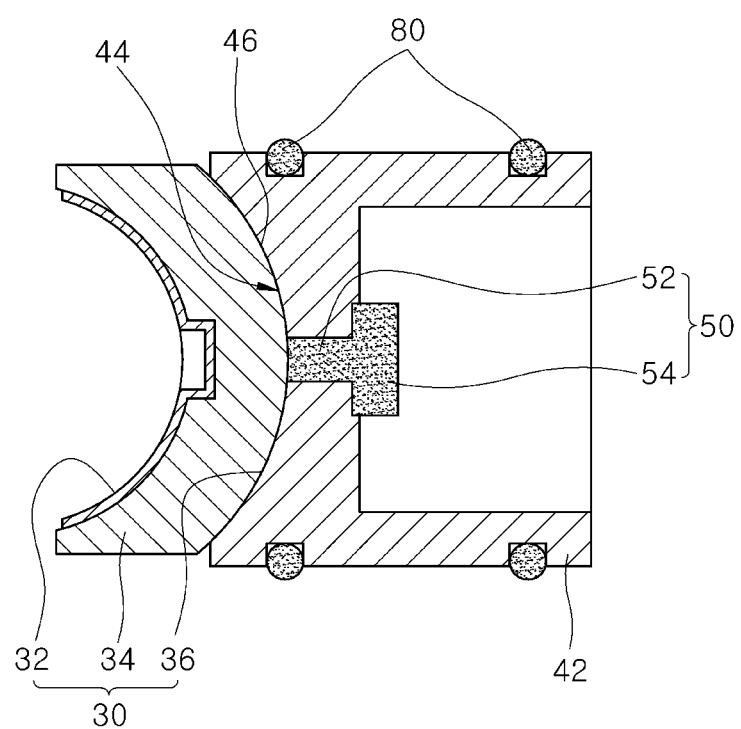
FIG. 3 is a cross-sectional view illustrating a state in which a pressing yoke part and a supporting yoke part are coupled in an embodiment of the present invention.
Figure 4:
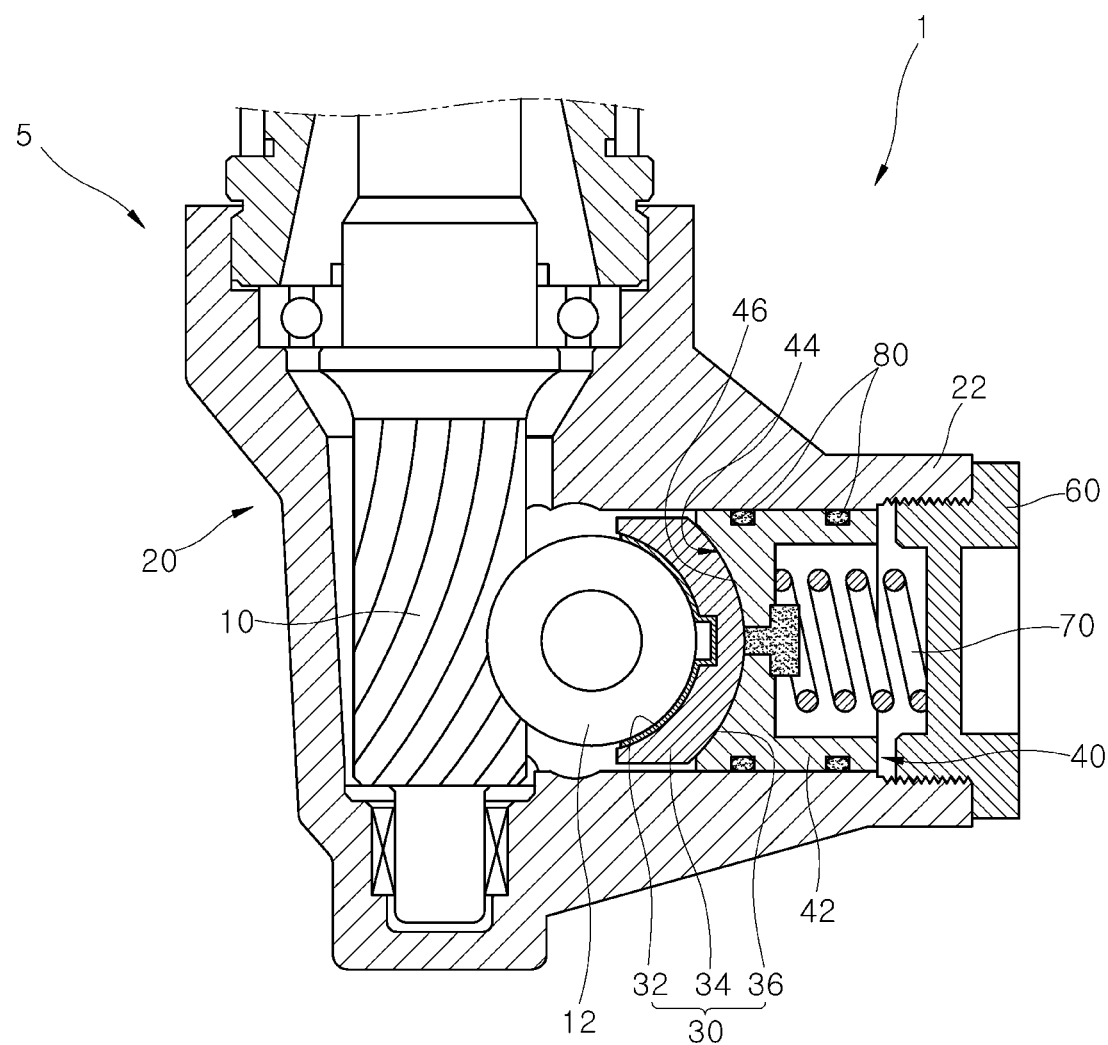
FIG. 4 is a cross-sectional view of a supporting apparatus for a steering gear box in accordance with an embodiment of the present invention.
Figure 5:
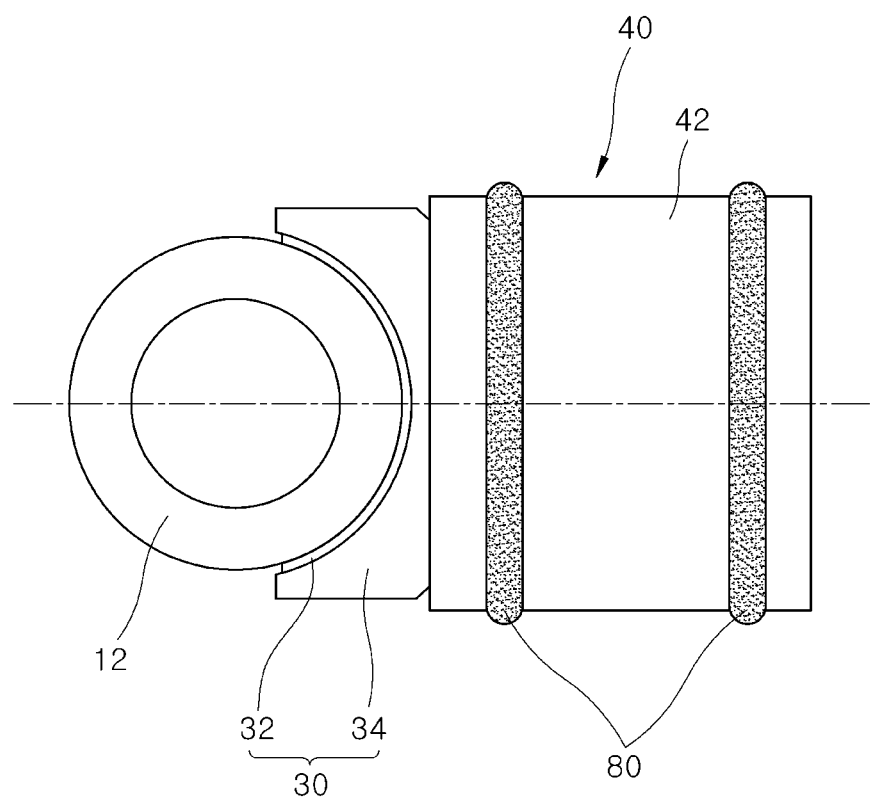
FIG. 5 is a front view illustrating a pressing yoke part and a supporting yoke part in accordance with an embodiment of the present invention.
Figure 6:
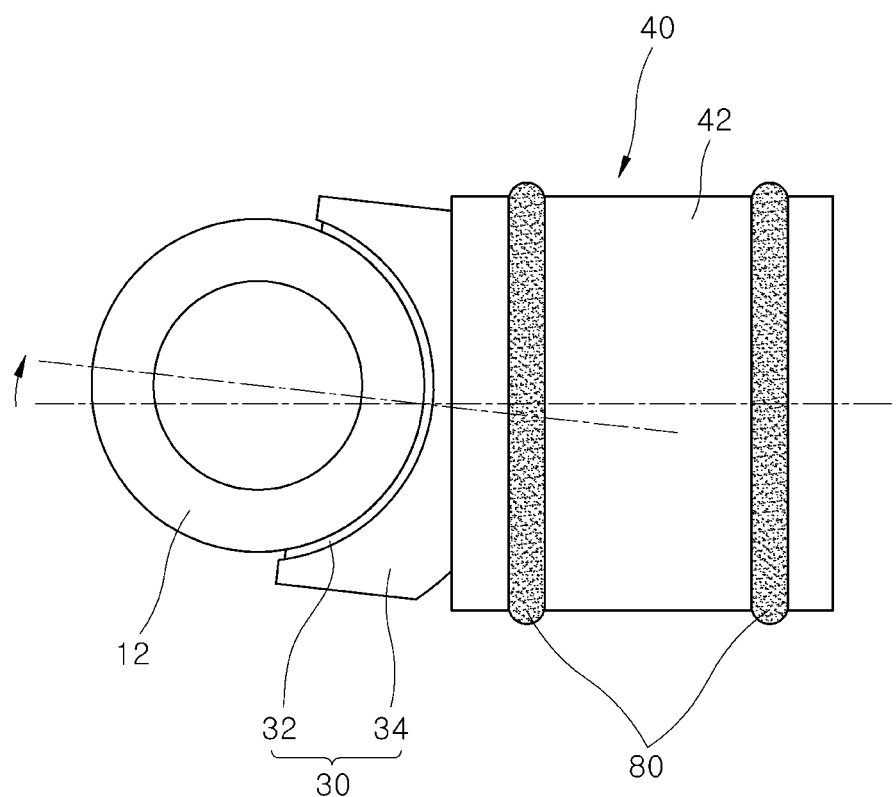
FIG. 6 is a front view illustrating a state in which a pressing yoke part is rotated upward along a rack bar in an embodiment of the present invention.
Figure 7:
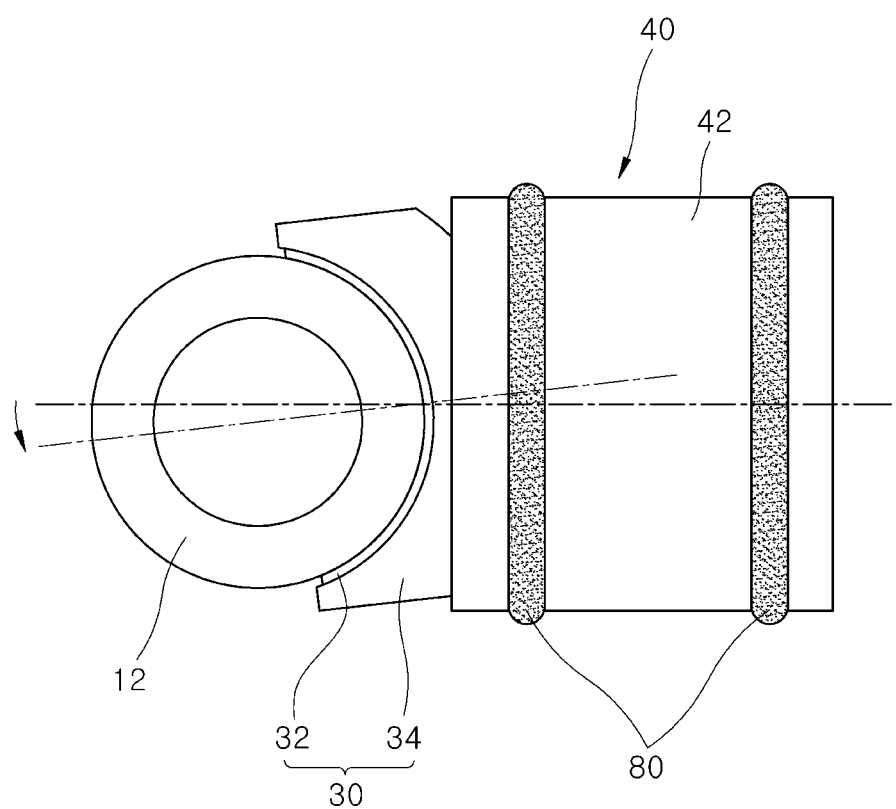
FIG. 7 is a front view illustrating a state in which a pressing yoke part is rotated downward along a rack bar in an embodiment of the present invention.

FIG. 1 is an exploded perspective view schematically illustrating a structure of a supporting apparatus for a steering gear box in accordance with an embodiment of the present invention, FIG. 2 is an exploded perspective view illustrating a pressing yoke part and a supporting yoke part in accordance with an embodiment of the present invention, FIG. 3 is a cross-sectional view illustrating a state in which a pressing yoke part and a supporting yoke part are combined in an embodiment of the present invention, FIG. 4 is a cross-sectional view of a supporting apparatus for a steering gear box in accordance with an embodiment of the present invention, FIG. 5 is a front view illustrating a pressing yoke part and a supporting yoke part in accordance with an embodiment of the present invention, FIG. 6 is a front view illustrating a state in which a pressing yoke part is rotated upward along a rack bar in an embodiment of the present invention, and FIG. 7 is a front view illustrating a state in which a pressing yoke v is rotated downward along a rack bar in an embodiment of the present invention.

As illustrated in FIG. 1, the supporting apparatus 1 for a steering gear box may include a pressing yoke part 30 for supporting a rack bar 12 in such a shape as to surround the side surface of the rack bar 12 engaged with a steering input gear 10, a supporting yoke part 40 provided in a mounting groove part 22 together with the pressing yoke part 30, an elastic link part 50 formed of an elastic material, extending from the pressing yoke part 30 and inserted into the supporting yoke part 40, a cover part 60 provided at a position facing the supporting yoke part 40 and shielding the inlet of the mounting groove part 22, and a pressing part 70 located between the supporting yoke part 40 and the cover part 60 and pressing the supporting yoke part 40 by a predetermined elastic force.

The steering input gear 10 may be installed through a housing part 20 of a steering gear box 5 in a vertical direction (based on FIG. 1). The rack bar 12 passing through the housing part 20 in the horizontal direction may be engaged with the steering input gear 10 and moved left and right.

The steering input gear 10 may be rotated by receiving a steering torque, and the rack bar 12 may be formed with a rack gear only on the side facing the steering input gear 10. One side of the rack bar 12 may be formed with a rack gear and the other side of the rack bar 12 may be formed with a cylindrical curved surface.

The pressing yoke part 30, the supporting yoke part 40, the elastic link part 50, the cover part 60, the pressing part 70, and a sealing member 80 may be installed inside the pipe-shaped mounting groove part 22 protruding from the side surface of the housing part 20.

As illustrated in FIGS. 1 to 4, since the pressing yoke part 30 is installed in such a shape as to surround the side surface of the rack bar 12 engaged with the steering input gear 10, the pressing yoke part 30 may be formed in various shapes within the technical concept of being in surface contact with the rack bar 12. The pressing yoke part 30 according to an embodiment may include a liner portion 32 and a head portion 34.

The liner portion 32 may be a curved member contacting the side surface of the rack bar 12 and provided in a concave shape toward the rack bar 12. The liner portion 32 may be detachably attached to the head portion 34. Thus, when the liner portion 32 is worn in contact with the rack bar 12, since only the liner portion 32 can be removed from the head portion 34 to be replaced, the maintenance cost can be reduced.

One side of the head portion 34 supporting the liner portion 32 and located inside the mounting groove part 22 may be connected to the liner portion 32 and the other side of the head portion 34 may be connected to the elastic link part 50. Since the head portion 34 has a convex curved surface facing the supporting yoke part 40, the operation of rotating with respect to the supporting yoke part 40 can be facilitated.

The head portion 34 according to an embodiment may be formed in a curved shape together with the liner portion 32. One side of the head portion 34, which faces the liner portion 32 forming the concave curved surface toward the lack bar 12 may also form a concave curved surface corresponding to the liner portion 32. And, the other side of the head portion 34, which faces the supporting yoke part 40 may be provided with a head curved surface portion 36 having a convex curved surface shape toward the supporting yoke part 40.

The supporting yoke part 40 may be provided in the mounting groove part 22 together with the pressing yoke part 30 and be moved in a liner direction along the inside of the mounting groove part 22. The supporting yoke part 40 according to an embodiment may include a supporting body portion 42, an inner supporting portion 44, and a mounting hole portion 48.

The supporting body portion 42 may be a circular tubular member inserted into the mounting groove part 22 and be moved in a direction toward the rack bar 12 or in a direction away from the rack bar 12 along the inner side of the mounting groove part 22 of a straight pipe shape. Since a plurality of sealing members 80 are provided at the outer side of the supporting body portion 42, leakage of lubricating oil through the outside of the supporting body portion 42 can be prevented.

The inner supporting portion 44 may shield one side of the supporting body portion 42, which faces the head portion 34 and support the head portion 34 in a rotatable manner. The side surface of the inner supporting portion 44, which faces the head portion 34 may form a concave curved surface, so that the inner supporting portion 44 can be in surface contact with the head curved surface portion 36 of the pressing yoke part 30 to stably support the pressing yoke part 30.

The mounting hole portion 48 may form a hole penetrating horizontally through the central portion of the inner supporting portion 44, so that the elastic link part 50 can be installed through the mounting hole portion 48.

Meanwhile, the height of the pressing yoke part 30 in the vertical direction may be smaller than the height of the supporting yoke part 40 so that the tilting operation of the pressing yoke part 30 in contact with the supporting yoke part 40 is facilitated. Therefore, the interference of the pressing yoke part 30 with the inside of the mounting groove part 22 when the pressing yoke part 30 is rotated around the supporting yoke part 40 can be avoided as much as possible.

In addition, the outer diameter of the head curved surface portion 36 may be smaller than the outer diameter of the supporting curved surface portion 46 in order to avoid the interference with the supporting yoke part 40 when the pressing yoke part 30 is rotated.

The elastic link part 50 may be formed of an elastic material and may extend from the pressing yoke part 30 to be inserted into the supporting yoke part 40. When the pressing yoke part 30 supporting the rack bar 12 is inclined or tilted up and down along the rack bar 12, the pressing yoke part 30 may be rotated or tilted about the elastic link part 50. The elastic link part 50 in accordance with an embodiment may include a link body 52 and a locking protrusion 54.

The link body 52 may have an elastic rod shape extending from the head portion 34 and passing through the mounting hole portion 48. The link body 52 protruding from the side surface of the pressing yoke part 30, which faces the mounting hole portion 48 may be inserted into the mounting hole portion 48.

The locking protrusion 54 may have a protruding shape protruding from the link body 52 and caught on the inside of the inner supporting portion 44. The locking protrusion 54 protruding from an end of the link body 52 may be caught by the inner supporting portion 44, and thus, can prevent the pressing yoke part 30 from being disengaged from the supporting yoke part 40.

When a vibration or an external shock is inputted to the rack bar 12 engaged with the steering input gear 10 and the rack bar 12 becomes bent, the pressing yoke part 30 supporting the rack bar 12 can be rotated around the supporting yoke part 40, so that the rack bar 12 can be stably supported. For this purpose, a portion where the pressing yoke part 30 and the supporting yoke part 40 meet with each other may be formed in a hemispherical shape so that the pressing yoke part 30 can be easily rotated.

Meanwhile, since the elastic link part 50 connecting the pressing yoke part 30 and the supporting yoke part 40 is formed of an elastic material such as rubber or urethane, the pressing yoke part 30 can be kept in contact with the supporting yoke part 40 continuously. Even if the mounting position of the pressing yoke part 30 is changed along the rack bar 12, the pressing yoke part 30 can be returned to the initial position by the elastic force of the elastic link part 50 because the elastic link part 50 is made of the elastic material. Therefore, the pressing yoke part 30 can stably support the rack bar 12, so that the rack bar 12 can be stably engaged with the steering input gear 10.

The cover part 60 may be provided at a position facing the supporting yoke part 40 and shield the inlet of the mounting groove part 22. A screw thread may be formed on the outer side of the cover part 60 according to an embodiment, and the cover part 60 may be fixed to the inlet of the mounting groove part 22 because the cover part 60 is engaged with the screw thread provided in the mounting groove part 22.

The pressing part 70 may be located between the supporting yoke part 40 and the cover part 60 and press the supporting yoke part 40 by a predetermined elastic force. The pressing part 70 according to an embodiment may use a coil spring. One side of the pressing part 70 may be in contact with the inner supporting portion 44 and the other side of the pressing part 70 may be in contact with the cover part 60. One side of the pressing part 70 may be inserted into the inside of the supporting body 42 and contact the inner supporting portion 44, so that the pressing part 70 can be stably supported on one side. Also, the other side of the pressing part 70 may be inserted into the groove portion formed on the side surface of the cover part 60, so that the other side of the pressing part 70 can also be stably supported.

The pressing part 70 may press the pressing yoke part 30 together with the supporting yoke part 40 in the direction toward the rack bar 12. Therefore, the rack bar 12 can be prevented from being moved away from the steering input gear 10 and spaced apart from the steering input gear 10. In addition, the pressing part 70 can prevent the gap between the rack bar 12 and the liner portion 32 from being generated by worn out of the liner portion 32, thereby preventing the generation of noise due to the gap.

In the supporting apparatus 1 for a steering gear box according to an embodiment of the present invention, the pressing yoke part 30 may contact the supporting yoke part 40 in a hemispherical shape in a state in which they are separated from each other. Therefore, the moving direction of the pressing yoke part 30 which is moved in correspondence with the movement of the rack bar 12 can be varied, so that the rack bar 12 can be stably supported. In a state in which the pressing yoke part 30 and the supporting yoke part 40 are separated from each other, the pressing yoke part 30 can be moved in correspondence with various movements including not only the left and right movement of the rack bar 12 but also the up and down rotation of the rack bar 12, so that the rack bar 12 can be stably supported, thereby making it possible to prevent the occurrence of operation noise.

Meanwhile, in addition to the method of using the elastic link part 50 formed as an elastic body in which the pressing yoke part 30 and the supporting yoke part 40 are connected to each other, there can be various variations such as a method of molding a separate elastic member between the pressing yoke part 30 and the supporting yoke part 40 and the like.

Hereinafter, an operation state of the supporting apparatus 1 for a steering gear box according to an embodiment of the present invention will be described in detail with reference to the accompanying drawings.

As illustrated in FIGS. 4 and 5, the rack bar 12 engaged with the steering input gear 10 performs a linear movement by the rotation of the steering input gear 10. When the position of the rack bar 12 is changed by the vibration or bending of the rack bar 12, the position of the pressing yoke part 30 supporting the rack bar 12 is also changed.

When the rack bar 12 is moved upward as shown in FIG. 6, the pressing yoke part 30 supporting the rack bar 12 is also rotated upward about the supporting yoke part 40 to stably support the rack bar 12.

Also, when the rack bar 12 is moved downward as shown in FIG. 7, the pressing yoke part 30 supporting the rack bar 12 is also rotated downward about the supporting yoke part 40 to stably support the rack bar 12.

As described above, according to the present invention, since the pressing yoke part 30 supporting the rack bar 12 is moved in various directions along with the movement of the rack bar 12 and supports the rack bar 12, it is possible to prevent uneven wear of the pressing yoke part 30 and to reduce the occurrence of vibration and noise. Also, since the elastic link part 50 connecting the pressing yoke part 30 and the supporting yoke part 40 is formed of an elastic material, the pressing yoke part 30 can be easily moved so that the rack bar 12 can be stably supported. In addition, when the abrasion occurs in the pressing yoke part 30 contacting the rack bar 12, the pressing yoke part 30 can be kept in contact with the rack bar 12 by the elastic support of the pressing part 70, so that noise can be prevented from being generated.

Further, since the pressing yoke part 30 is kept in contact with the rack bar 12 at all times, it is possible to reduce the uneven wear of the liner portion 32, thereby making it possible to reduce the operation noise caused by the wear of the liner portion 32.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A supporting apparatus for a steering gear box, comprising:
   a pressing yoke part for supporting a side surface of a rack bar engaged with a steering input gear in a shape to wrap the side surface of the rack bar;
   a supporting yoke part provided in a mounting part together with the pressing yoke part;
   an elastic link part formed of an elastic material and extending from the pressing yoke part to be inserted into the supporting yoke part;
   a cover part provided at a position opposite to the supporting yoke part and shielding an inlet of the mounting part; and
   a pressing part located between the supporting yoke part and the cover part and configured to press the supporting yoke part by a predetermined elastic force,
   wherein the pressing yoke part comprises:
      a curved liner portion contacting the side surface of the rack bar; and
      a head portion connected to the liner portion at one side and connected to the elastic link part at the other side,
   wherein the head portion has a convex curved side surface facing the supporting yoke part.

2. The supporting apparatus for a steering gear box of claim 1, wherein the supporting yoke part comprises:
   a cylindrical tubular support body inserted into the mounting part;
   an inner supporting portion for shielding one side of the support body facing the head portion and rotatably supporting the head portion; and
   a mounting hole portion forming a hole penetrating through the inner supporting portion and mounting the elastic link part.

3. The supporting apparatus for a steering gear box of claim 2, wherein the inner supporting portion has a concave curved surface on a side facing the head portion.

4. The supporting apparatus for a steering gear box of claim 2, wherein the elastic link part comprises:
   a link body of an elastic material, which extends from the head portion and passes through the mounting part; and
   a latching protrusion protruded from the link body and caught to the inside of the inner supporting portion.

5. The supporting apparatus for a steering gear box of claim 2, wherein the pressing part uses a coil spring, one side of the pressing part is in contact with the inner supporting portion, and the other side of the pressing part is in contact with the cover part.

6. The supporting apparatus for a steering gear box of claim 2, wherein a screw thread is formed on an outer side of the cover part to be engaged with a screw thread formed in the mounting part.

* * * * *